No. 820,759. PATENTED MAY 15, 1906.
H. BESSER.
SEWER AND CULVERT MOLD.
APPLICATION FILED NOV. 11, 1905.

2 SHEETS—SHEET 1.

WITNESSES:

INVENTOR
Herman Besser
BY
ATTORNEYS

No. 820,759. PATENTED MAY 15, 1906.
H. BESSER.
SEWER AND CULVERT MOLD.
APPLICATION FILED NOV. 11, 1905.

2 SHEETS—SHEET 2.

WITNESSES:

INVENTOR
Herman Besser
BY
ATTORNEYS

UNITED STATES PATENT OFFICE.

HERMAN BESSER, OF ALPENA, MICHIGAN.

SEWER AND CULVERT MOLD.

No. 820,759.         Specification of Letters Patent.         Patented May 15, 1906.

Application filed November 11, 1905. Serial No. 286,929.

*To all whom it may concern:*

Be it known that I, HERMAN BESSER, a citizen of the United States, and a resident of Alpena, in the county of Alpena and State of Michigan, have invented a new and Improved Sewer and Culvert Mold, of which the following is a full, clear, and exact description.

My invention relates to a mold for producing the bottoms and sides of sewers and culverts, it being especially designed for that form of structures of this character which is made of three pieces, the two side pieces meeting at the top and being secured together at that point.

The principal objects of the invention are to provide for adjusting the parts of a mold so as to permit sewer and culvert sections of different sizes to be molded in the same mold, to provide means whereby all sides except one of articles of this character can be formed by the usual molding process against the surfaces of the mold and the other side by the use of a sweep or trowel moved along the edges of two sides of the mold, and to provide a construction of mold parts which will permit the ready disassembling thereof and provide for easily setting up the molds and efficiently securing their several parts together.

Reference is to be had to the accompanying drawings, forming a part of this specification, in which similar characters of reference indicate corresponding parts in all the figures.

Figure 1:
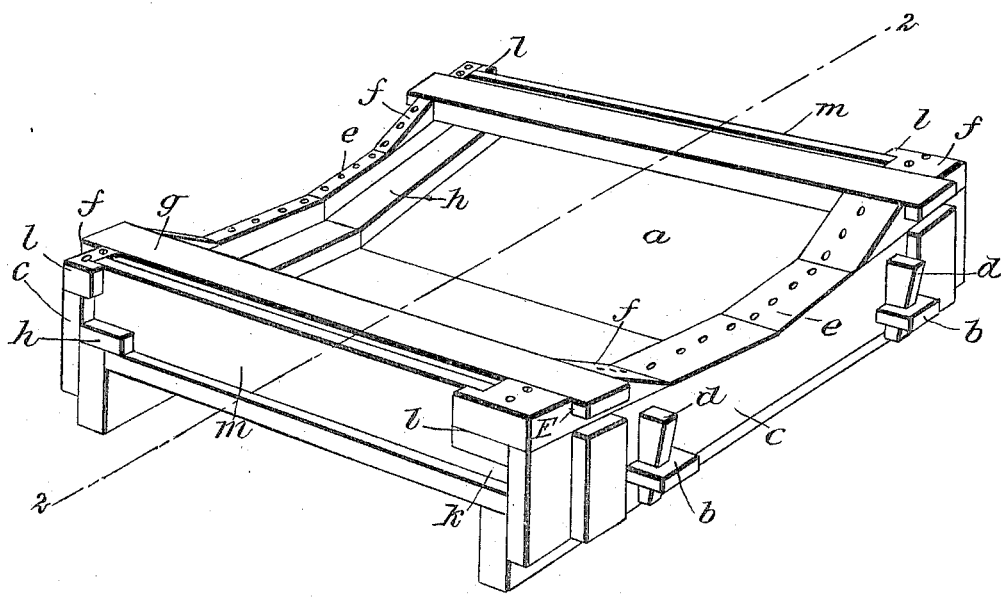
Figure 2:
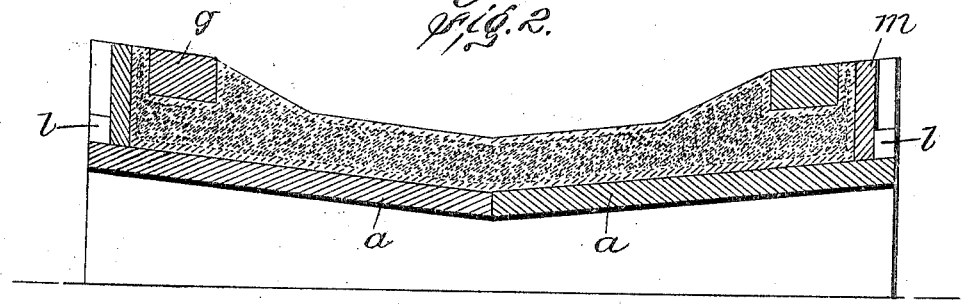
Figure 3:
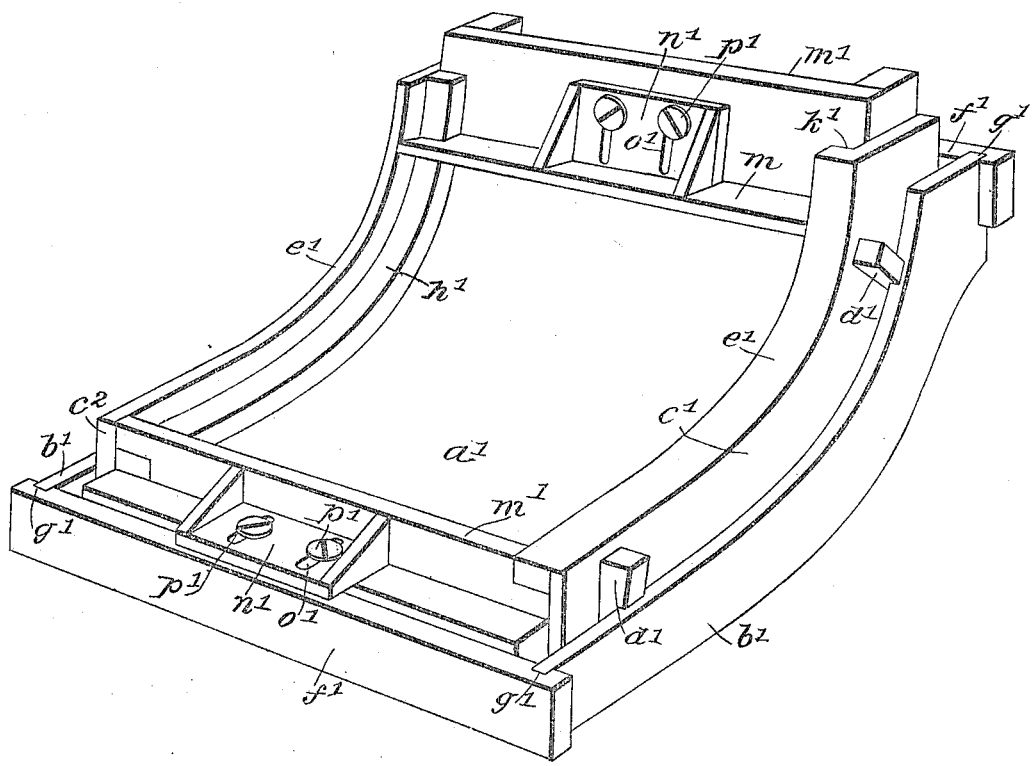

Figure 1 is a perspective view of a mold for forming the bottom of a sewer or culvert. Fig. 2 is a sectional view of the same on the line 2 2 of Fig. 1, and Fig. 3 is a perspective view of a similar mold employed for forming the sides of the sewer or culvert.

The mold shown in Figs. 1 and 2 comprises a base *a*, which has two sloping walls in order to provide the objects to be molded with a central gutter. This base has a plurality of projections *b*, extending through a side wall *c*, which is intended to be mounted adjacent to the base. In order to securely hold the parts together, wedges *d* are driven through these projections bearing upon the outer surface of the side wall. The opposite side wall is stationary. The side walls are provided with upper surfaces *e*, which are of such shape as to guide a sweep or trowel along the mold in such a manner as to form a guttered upper surface on the base to be constructed. On these upper surfaces, which slope upwardly from the center to the ends, are adjustable plates *f*, the upper surfaces of which are of such shape as to guide the sweep or trowel at the ends of the mold to give the desired shape to the block. These plates constitute a part of the side walls, but can be adjusted by changing the screws with which they are held, so as to move up and down the surfaces *e* to regulate the length of the mold. They are provided with notches F for receiving core-plates *g*. These core-plates preferably extend across the mold and form depressions in the molded article for the purpose of receiving the edges of the side walls of the culvert and move out and in with the plates *f*.

The two side walls are not of exactly the same shape, being made complementary to each other—that is, one side wall is provided with a ledge *h*, projecting inwardly at the bottom, and the other is provided with a corresponding longitudinal notch *k*, which has substantially the same shape as the ledge *h*. These two features are for the purpose of providing, respectively, a groove and a projection in the opposite edges of the base-piece to be molded, whereby when two of the base-pieces are mounted adjacent to each other end to end the projection of one will enter the groove of the other and assist in forming a tight joint. The plates *f* are provided with projections *l*, which engage the outer surfaces of end plates *m*. These end plates are held against the projections *l* and constitute the end boundaries of the mold and are of course adjusted with the plates *f*.

In the use of this mold the parts being placed in position flat on the floor the molding material is introduced, and then a sweep or trowel is moved along the guiding-surfaces *e*, so as to give the molded article the shape represented in Fig. 2, or the material is tamped and troweled off to the same surface. When the concrete is hardened, the core-plates *g* are removed, and one of the sides can then be easily taken off by loosening the wedges *d*, which will permit the molded base-piece to be removed from the mold.

In Fig. 3 I have shown another form of my invention which is designed for making the side walls of a three-part culvert or sewer. This mold is similarly constructed, having a bottom *a'* curved upwardly at one end and having a continuous curved projection *b'* extending therefrom to hold a removable wall $c'$ by means of the wedges $d'$. The rear wall $c^2$ is stationary, as in the other case. Both side walls have guiding edges $e'$, straight at one end and curved at the other. In this case the side walls are held in position by means of end plates $f'$, having notches $g'$ for receiving the end of the projections $b'$. The stationary side wall also has a ledge $h'$ and the movable wall a groove $k'$ for purposes similar to the ledge $h$ and groove $k$ of the other construction. This mold is provided with end walls $m'$, adjusted in a manner similar to that described above. To these walls are secured brackets $n'$, having slots $o'$ for receiving adjusting-screws $p'$. These end walls are adapted to be adjusted toward and from each other, so as to provide for making side walls of different heights and different degrees of curvature in the same mold. The operation of this mold is substantially the same as that described above.

Having thus described my invention, I claim as new and desire to secure by Letters Patent—

1. A mold comprising a base, side walls connected with the base, and having their upper edges in the same horizontal plane, guiding-plates adjustably mounted on the edges of the side walls at each end thereof, said plates being provided with notches, transverse core-blocks resting in the notches, and end walls connected to said plates and movable therewith.

2. A mold comprising a base and two side walls having guiding upper edges, and one of said side walls being removably mounted on the base, said base being provided with projections extending beyond the outer surface of said side wall, and wedges inserted between said projections and the side wall.

3. A mold comprising a base, side walls connected with the base and having their upper edges in the same horizontal plane, guiding-plates adjustably mounted on the edges of the side walls at each end thereof, and core-blocks and end walls connected to the guiding-plates and movable therewith.

4. A mold comprising a base and side walls, guiding-plates adjustably mounted on the edges of the side walls at each end thereof, and core-blocks and end walls connected to the plates and movable therewith.

5. A mold comprising a base and side walls, guiding-plates adjustably mounted on the side walls at each end thereof, and end walls connected to the guiding-plates and movable therewith.

6. A mold comprising a base of concave form and two side walls, one of said side walls being removably mounted upon the base, one of the side walls being also provided with a ledge extending in parallel position with respect to the base and the other side wall being provided with a groove of the same shape and size as said ledge, the mold also having adjustable end walls fitting said ledge and groove.

7. A mold comprising a base of concave form and two side walls, one of said side walls being removably mounted upon the base, one of the side walls being also provided with a ledge extending in parallel position with respect to the base, and the other side wall being provided with a groove of the same shape and size as said ledge.

In testimony whereof I have signed my name to this specification in the presence of two subscribing witnesses.

HERMAN BESSER.

Witnesses:
JOHN R. McHARG,
VERNON C. RUTLEDGE.